(12) United States Patent
Beil et al.

(10) Patent No.: US 12,129,780 B2
(45) Date of Patent: Oct. 29, 2024

(54) COMBUSTION ENGINE FOR A MOTOR VEHICLE, AND MOTOR VEHICLE

(71) Applicant: Mercedes-Benz Group AG, Stuttgart (DE)

(72) Inventors: Heiko Beil, Stuttgart (DE); Rene Ernst, Leimersheim (DE); Siegfried Mueller, Ingersheim (DE); Michael Heinrichsmeyer, Steinheim (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/040,520

(22) PCT Filed: Jul. 20, 2021

(86) PCT No.: PCT/EP2021/070202
§ 371 (c)(1),
(2) Date: Feb. 3, 2023

(87) PCT Pub. No.: WO2022/028872
PCT Pub. Date: Feb. 10, 2022

(65) Prior Publication Data
US 2023/0287819 A1 Sep. 14, 2023

(30) Foreign Application Priority Data
Aug. 5, 2020 (DE) ..................... 10 2020 004 729.7

(51) Int. Cl.
*F02M 26/04* (2016.01)
*F01N 3/20* (2006.01)
(Continued)

(52) U.S. Cl.
CPC ......... *F01N 3/2013* (2013.01); *F01N 3/2033* (2013.01); *F02B 37/10* (2013.01);
(Continued)

(58) Field of Classification Search
CPC ...... F01N 3/2013; F01N 3/323; F01N 3/2033; F01N 2240/14; F01N 2240/16;
(Continued)

(56) References Cited

U.S. PATENT DOCUMENTS 10,830,116 B2  11/2020  Laube et al.
10,989,084 B2   4/2021  Laube

FOREIGN PATENT DOCUMENTS

DE  10 2016 014 254 A1  6/2017
DE  10 2017 213 004 A1  1/2019
(Continued)

OTHER PUBLICATIONS

English translation of WO-2019033134 by PE2E Oct. 14, 2023.*
(Continued)

*Primary Examiner* — Deming Wan
(74) *Attorney, Agent, or Firm* — Crowell & Moring LLP

(57) ABSTRACT

A combustion engine for a motor vehicle includes an output shaft, an intake tract, an exhaust gas tract, an exhaust gas aftertreatment device disposed in the exhaust gas tract, a heating element disposed in the exhaust gas tract upstream of the exhaust gas aftertreatment device, an electrically assisted exhaust gas turbocharger, and a conduit element which is fluidically connected to the exhaust gas tract at a first connection point disposed downstream of the exhaust gas aftertreatment device and at a second connection point disposed upstream of the heating element.

10 Claims, 1 Drawing Sheet

(51) Int. Cl.
    *F02B 37/10* (2006.01)
    *F02B 39/10* (2006.01)
    *F02M 26/06* (2016.01)
    *F02M 26/16* (2016.01)
(52) U.S. Cl.
    CPC ............ *F02B 39/10* (2013.01); *F02M 26/06* (2016.02); *F02M 26/16* (2016.02)
(58) Field of Classification Search
    CPC ........ F02M 26/06; F02M 26/16; F02M 26/04; F02B 37/10; F02B 39/10
    See application file for complete search history.

(56) References Cited

FOREIGN PATENT DOCUMENTS

| DE | 10 2018 106 588 A1 | 9/2019 | |
|---|---|---|---|
| DE | 10 2018 129 955 A1 | 5/2020 | |
| WO | WO-2019033134 A1 * | 2/2019 | .............. F01N 11/00 |

OTHER PUBLICATIONS

German-language German Office Action issued in German application No. 10 2020 004 729.7 dated Mar. 10, 2023 (Nine (9) pages).
PCT/EP2021/070202, International Search Report dated Dec. 9, 2021 (Two (2) pages).
German-language German Office Action issued in German application No. 10 2020 004 729.7 dated Mar. 11, 2021 (Five (5) pages).
U.S. Patent Application, "Internal Combustion Engine for a Motor Vehicle and Motor Vehicle", filed Feb. 3, 2023, Inventor Heiko Beil et al.

* cited by examiner

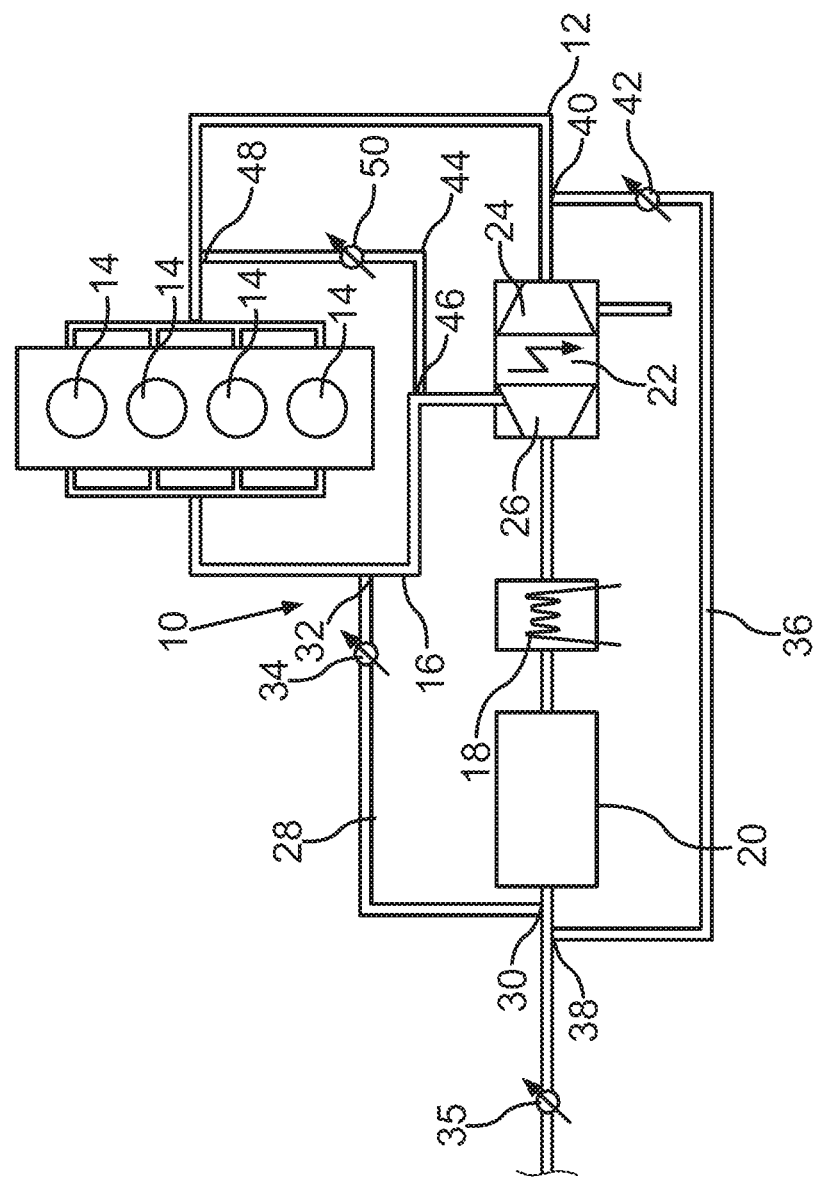

COMBUSTION ENGINE FOR A MOTOR VEHICLE, AND MOTOR VEHICLE

BACKGROUND AND SUMMARY OF THE INVENTION

The invention relates to a combustion engine for a motor vehicle. Furthermore, the invention relates to a motor vehicle.

DE 10 2017 213 004 A1 discloses a combustion engine comprising an internal combustion engine, a fresh gas section for supplying fresh gas to the internal combustion engine, an exhaust gas section for discharging exhaust gas from the internal combustion engine, and at least one exhaust gas aftertreatment device integrated in the exhaust gas section. The combustion engine further comprises an electrically drivable compressor integrated in the fresh gas section or the exhaust gas section and a heating device upstream of or integrated in the exhaust gas aftertreatment device for heating a gas flowing through the latter. The combustion engine has a control device which is configured in such a way that, when the internal combustion engine is not in operation, it operates the compressor simultaneously with the heating device as required if the temperature of a component of the combustion engine is below a defined limit value.

Furthermore, DE 10 2018 129 955 A1 discloses a method for pre-conditioning an exhaust gas system for discharging and purifying combustion exhaust gases of an internal combustion engine, in particular of an internal combustion engine of a motor vehicle, wherein air is heated in the exhaust gas system by a heating element. A hot air flow is generated in the exhaust gas system with the heated air by a fan, wherein a first catalyst of the exhaust gas system is heated to a minimum operating temperature by the hot air flow.

It is the object of the present invention to create a combustion engine and a motor vehicle so that heating of an exhaust gas aftertreatment device can be carried out particularly advantageously and particularly quickly.

A first aspect of the invention relates to a combustion engine for a motor vehicle which can be driven by the combustion engine via an output shaft of the combustion engine. The combustion engine comprises at least one combustion chamber and an intake tract through which air can flow, wherein air can be supplied to the combustion chamber via the intake tract. Furthermore, the combustion engine comprises an exhaust gas tract through which an exhaust gas from the combustion chamber can flow, wherein an exhaust gas aftertreatment device for aftertreating the exhaust gas is arranged in the exhaust gas tract. In addition, at least one heating element for heating a gas flowing through the exhaust gas tract is arranged in the exhaust gas tract upstream of the exhaust gas aftertreatment device. The combustion engine comprises an electrically assisted exhaust gas turbocharger, which has a compressor wheel arranged in the intake tract as a first impeller for compressing the air flowing through the intake tract. The electrically assisted exhaust gas turbocharger also has a turbine wheel as a second impeller, which is arranged in the exhaust gas tract and can be driven by the exhaust gas, as well as an electric machine. By means of the electric machine, at least one of the two impellers can be driven in heating operation for heating the exhaust gas aftertreatment device, whereby in heating operation, during which combustion processes in the combustion chamber do not take place and the output shaft is at a standstill, air can be conveyed as a heating medium by means of the at least one impeller into the exhaust gas tract. The heating medium can be warmed by means of the heating element in heating operation to heat the exhaust gas aftertreatment device. Thus, for example, the heating medium is the gas or a gas that can be heated or warmed by means of the heating element.

In accordance with the invention, the combustion engine has at least one conduit element which is fluidically connected to the exhaust gas tract at a first connection point arranged downstream of the exhaust gas aftertreatment device and at a second connection point arranged upstream of the heating element. By means of the conduit element, at least some of the heating medium can be returned from the first connection point to the second connection point and introduced into the exhaust gas tract at the second connection point. The motor vehicle is preferably configured as a motor vehicle, in particular as a passenger car. The combustion engine can be configured as a reciprocating engine and can have an engine block which comprises the combustion chamber. A fluid, typically air, flows into the combustion chamber via the intake tract. In fired operation, combustion processes take place in the combustion chamber. During the combustion process, a fuel-air mixture is burned, thus producing the exhaust gas of the combustion engine.

In the exhaust gas tract, which in particular can also be referred to as the exhaust gas system, the exhaust gas aftertreatment device is arranged for aftertreating the exhaust gas. In other words, the exhaust gas aftertreatment device serves to purify the exhaust gas by means of, in particular, at least one catalyst and/or at least one filter, such as a particle filter. By means of the catalyst, pollutants present in the exhaust gas, such as carbon monoxide, nitrogen monoxide, nitrogen dioxide or unburned hydrocarbons, are converted into harmless substances by means of at least one chemical reaction. The catalyst is understood to mean in particular a component which particularly lowers an activation energy of the chemical reaction, as a result of which a reaction rate of the chemical reaction takes place particularly quickly. The activation energy is in particular an amount of energy required to start the chemical reaction. The reaction rate is in particular a rate at which the chemical reaction proceeds. A filter is in particular a component which retains solids from a gas flow or liquid flow. In particular, solids or pollutants referred to as particles or soot can thus be filtered out of the exhaust gas.

In order to allow particularly good purification of the exhaust gas of the combustion engine, it is advantageous for the exhaust gas aftertreatment device, in particular the catalyst, to have a minimum temperature, which can be referred to in particular as a conversion temperature or light-off temperature or start-up temperature. For this purpose, heating up of the exhaust gas aftertreatment device is necessary, in particular in the case of a cold start. A cold start is understood to be in particular a launching, a starting, a cranking or an activation of the combustion engine, in which a temperature of the combustion engine corresponds approximately to the ambient temperature. When the combustion engine is started, the combustion engine is brought from a state in which combustion processes in the combustion chamber cease and the output shaft is stationary, which is also referred to as a stopped engine, to an activated state, which is referred to in particular as fired operation. After the cold start, the exhaust gas aftertreatment device is heated by means of the exhaust gas. In particular for vehicles with a combination of an internal combustion engine and electric driving, heating or keeping the exhaust gas tract warm by means of the exhaust gas becomes particularly difficult, since a mass flow of the exhaust gas may be very low or non-existent in some operating states. Electric driving refers in particular to electric-propelled driving of the motor vehicle, wherein during electric-propelled driving the motor vehicle is at least partially driven by an electric machine.

The heating element arranged in the exhaust gas tract upstream of the exhaust gas aftertreatment device can particularly accelerate the heating of the exhaust gas aftertreatment device, especially after a cold start. The heating element is configured such that it heats the gas flowing through or around the heating element, for example the exhaust gas. The gas is the exhaust gas in normal operation and/or during cold starting of the combustion engine. In heating operation of the combustion engine, which is different from normal operation, the gas is the air which is warmed by means of the heating element and is used as a heating medium for warming or heating the exhaust gas aftertreatment device.

In order to allow a particularly advantageous and rapid heating of the exhaust gas aftertreatment device, the conduit element according to the invention is provided. In heating operation, the heating medium can be conveyed, for example, by means of the electric, electrically assisted or electrically assistable exhaust gas turbocharger from the intake tract into the exhaust gas tract to the heating element and/or the heating medium can be conveyed in the exhaust gas tract and thus circulate, in particular via the conduit element. In this case, at least one of the two impellers is driven by means of the electric machine using electrical energy, which can be taken in particular from a power supply device referred to as the on-board power supply system. By means of the conduit element, at least some of the heating medium heated by the heating element can be returned to the heating element and the exhaust gas aftertreatment device after it has flowed through the exhaust gas aftertreatment device, thus creating a recirculation circuit. In this way, not only the exhaust gas aftertreatment device is heated, but also other parts of the exhaust gas tract. As a result, there is a particularly low temperature gradient between the exhaust gas aftertreatment device and its surrounding components of the exhaust gas tract, whereby particularly little heat is transported away from the exhaust gas aftertreatment device to the surrounding components of the exhaust gas tract. In other words, the heat loss of the exhaust gas aftertreatment device is particularly low. As a result, the heating and keeping warm of the exhaust gas aftertreatment device can be made particularly efficient. In addition, the heating medium can be brought to a particularly high temperature in a short time, whereby the exhaust gas aftertreatment device can be warmed efficiently and effectively. The recirculation circuit can be operated in particular when the engine is stopped. A conveyance of the heating medium in the recirculation circuit can in particular be effected or at least assisted by means of the electrically driven, at least one impeller, in particular by means of the second impeller. In other words, the recirculation circuit can be maintained by means of the electrically driven, at least one impeller. A conditioning of the exhaust gas aftertreatment device is thus made possible, in particular when the engine is stopped. As a result, particularly few pollutants are emitted by the combustion engine, especially after a cold start.

In one embodiment of the invention, there is arranged in the conduit element a valve element by means of which a quantity of the heating medium flowing through the conduit element can be adjusted. For this purpose, the valve element can be connected to a control device, which is represented by a control unit, for example, or is also referred to as a control unit. The conduit element can be closed only partially or completely by means of the valve element.

In a further embodiment of the invention, the combustion engine has an exhaust gas return conduit which is fluidically connected to the exhaust gas tract at a branch point arranged downstream of the turbine wheel, in particular downstream of the exhaust gas aftertreatment device. In addition, the exhaust gas return conduit is fluidically connected to the intake tract at an inlet point. The inlet point can be arranged in the intake tract upstream or downstream of the compressor wheel. By means of the exhaust gas return conduit, at least some of the exhaust gas of the branching point can be branched off from the exhaust gas tract and introduced into the exhaust gas return conduit. The exhaust gas introduced into the exhaust gas return conduit can flow through the exhaust gas return conduit and is guided by means of the exhaust gas return conduit to the inlet point and introduced into the intake tract at the inlet point, which can be referred to in particular as low-pressure exhaust gas recirculation. This allows the exhaust gas to be guided into the combustion chamber. A proportion of exhaust gas that is already present in the combustion chamber before the start of the combustion process can keep pollutants that are formed during the combustion process particularly low. These can be nitrogen monoxide or nitrogen dioxide in particular, both of which are generally referred to as nitrogen oxides in particular. In heating operation, for example, at least some of the heating medium can be routed from the branch point to the inlet point and introduced into the intake tract at the inlet point.

In a further embodiment, there is arranged in the exhaust gas return conduit an exhaust gas return valve, by means of which a quantity of the exhaust gas and/or of the heating medium flowing through the exhaust gas return conduit can be adjusted. For this purpose, the exhaust gas return valve can be connected to the control device and can be controlled and thereby operated by the control device. The exhaust gas return conduit can, for example, be only partially or completely closed by means of the exhaust gas return valve.

Another embodiment is characterized in that the combustion engine has a return conduit which is fluidically connected to the exhaust gas tract at a third connection point arranged upstream of the turbine wheel and is fluidically connected to the intake tract at a fourth connection point. The fourth connection point can preferably be arranged downstream of the compressor wheel. By means of the return conduit, for example, at least some of the exhaust gas flowing through the exhaust gas tract can be branched off from the exhaust gas tract and introduced into the return conduit. The exhaust gas introduced into the return conduit can flow through the return conduit in a first flow direction and is thereby guided by means of the return conduit from the third connection point to the fourth connection point and introduced into the intake tract at the fourth connection point, which can be referred to in particular as high-pressure exhaust gas return. In heating operation, at least some of the heating medium or the entire heating medium can be branched off from the intake tract at the fourth connection point and introduced into the return conduit. The exhaust gas introduced into the return conduit can flow through the return conduit in a second flow direction opposite to the first flow direction and is guided by means of the return conduit from the fourth connection point to the third connection point. In this way, the heating medium is guided from the intake tract to the heating element, bypassing the combustion chamber or all combustion chambers of the combustion engine, whereby the heating medium and subsequently the exhaust gas aftertreatment device can be heated particularly effectively.

In a further embodiment of the invention, there is arranged in the return conduit a return valve, by means of which a quantity of exhaust gas and/or of heating medium flowing through the return conduit can be adjusted. For this purpose, the return valve can be connected to the control device and can be controlled by the control device. The return conduit can be closed only partially or completely by means of the return valve, for example.

Lastly, it has been shown to be particularly advantageous if the heating element comprises at least one electric heating element and/or at least one burner and/or at least one electric catalyst. The electric heating element is understood to mean in particular a heating element that converts electrical current into heat. A burner means in particular a heating element in which at least one fuel, in particular a liquid or gaseous fuel, is burned with the formation of a flame or flamelessly and thus catalytically, in particular with the release or emission of heat. The electric catalyst is understood to mean in particular a catalyst which is heated or can be heated by means of an electric heating element, wherein the electric heating element can be attached, for example, to a housing of the catalyst and/or can be connected to a catalytic or catalytically active structure of the catalyst.

A second aspect of the invention relates to a motor vehicle comprising a combustion engine according to the invention in accordance with the first aspect of the invention. Advantages and advantageous embodiments of the first aspect of the invention are to be regarded as advantages and advantageous embodiments of the second aspect of the invention, and vice versa. The motor vehicle according to the invention is preferably configured as a motor vehicle, in particular as a passenger car or lorry, or as a passenger bus or motorbike.

Further advantages, features and details of the invention will become apparent from the following description of preferred exemplary embodiments and with reference to the drawing. The features and combinations of features mentioned above in the description as well as the features and combinations of features mentioned below in the description of the FIGURE and/or shown alone in the single FIGURE can be used not only in the combination indicated in each case, but also in other combinations or in isolation, without departing from the scope of the invention.

BRIEF DESCRIPTION OF THE DRAWING

The drawing shows in the only FIGURE a schematic representation of a combustion engine according to the invention.

DETAILED DESCRIPTION OF THE DRAWING

The single FIGURE schematically shows a combustion engine 10 for a motor vehicle, in particular for a motor vehicle preferably configured as a passenger car. The motor vehicle can be driven here by means of the combustion engine 10. The combustion engine 10 has an intake tract 12, at least one cylinder, and an exhaust gas tract 16. The cylinder partially delimits a combustion chamber 14. The combustion engine 10 comprises a piston which is received in the cylinder so as to be movable in translation. The piston partially delimits the combustion chamber 14. In the exemplary embodiment shown in the FIGURE the engine is a four-cylinder engine comprising exactly four combustion chambers 14.

A fluid in the form of air can flow through the inlet tract and is guided into the combustion chamber 14 by means of the intake tract. Combustion processes take place in the combustion chamber 14 during fired operation of the combustion engine 10, thus resulting in an exhaust gas of the combustion engine 10. The exhaust gas can flow through the exhaust gas tract 12, also referred to as the exhaust gas system, and can leave the combustion chamber 14 via the exhaust gas tract 12. At least one heating element 18 and an exhaust gas aftertreatment device 20 are arranged in the exhaust gas tract 16, wherein the heating element 18 is arranged upstream of the exhaust gas aftertreatment device 20. The exhaust gas aftertreatment device 20 comprises at least one element for exhaust gas purification. The element for exhaust gas purification can be configured, for example, as an oxidation catalyst, in particular a diesel oxidation catalyst (DOC), as an NOx storage catalyst (NSC), as an SCR catalyst (Selective Catalytic Reduction Catalyst), as a diesel particulate filter (DPF) or as an SCR catalyst on a diesel particulate filter (SDPF).

The term oxidation catalyst refers in particular to a catalyst that removes carbon monoxide and unburned hydrocarbons from the exhaust gas by means of oxidation with a residual oxygen. Residual oxygen refers in particular to oxygen molecules that were not part of a chemical reaction during the combustion processes and are therefore available as oxygen for further chemical reactions. The NOx storage catalyst (NSC) is understood to mean in particular a catalyst which has a storage component in which nitrogen oxides are chemically bound and thus removed from the exhaust gas. Subsequently, in an operating state of the combustion engine which has a lack of oxygen in the exhaust gas, the nitrogen oxides can be released again from the storage component and reduced with reducing components, such as unburned hydrocarbons or carbon monoxide. An SCR catalyst means in particular a catalyst in which nitrogen oxides are converted with urea from an introduced urea solution into nitrogen and water in a redox reaction. A diesel particulate filter (DPF) is understood to mean in particular a filter that removes particles, also known as soot or fine dust, from the exhaust gas.

The combustion engine 10 also has an electric, electrically assisted or electrically assistable exhaust gas turbocharger 22, which comprises a compressor wheel arranged in the intake tract 12 as a first impeller 24, a turbine wheel arranged in the exhaust gas tract 16 as a second impeller 26, and a shaft. The first impeller 24 and the second impeller 26 are arranged on the shaft and are connected to the shaft for conjoint rotation. The first impeller 24, the second impeller 26 and the shaft are, for example, separately formed components which are connected to one another in such a way that relative rotations between the components and movements relative to one another in the axial direction and in the radial direction of the shaft are prevented or avoided. The first impeller 24 is used, for example, to compress the air to be supplied to the combustion chamber 14 via the intake tract 12. By means of the second impeller 26, for example, the exhaust gas flowing from the combustion chamber 14 into the exhaust gas tract 16 is expanded, whereby the second impeller 26 is driven by the exhaust gas. Furthermore, the combustion engine 10 comprises an electric machine with which the exhaust gas turbocharger 22 can be driven using electrical energy. The electric machine can be configured to drive the shaft of the exhaust gas turbocharger 22 so that the first impeller 24 and the second impeller 26 are driven by means of the shaft. Alternatively, the electric machine can be configured in such a way that the first impeller 24 and/or the second impeller 26 can be driven directly by the electric machine. This shall be understood to mean that the shaft is not directly driven by the electric machine. The combustion engine 10 also has an output shaft in the form of a crankshaft, for example, via which the combustion engine can provide torques for driving the motor vehicle, in particular in fired operation of the combustion engine 10. In heating operation of the combustion engine 10, air is conveyed as a heating medium into the exhaust gas tract 16 by means of the electrically assisted exhaust gas turbocharger 22, in that at least one of the two impellers 24, 26 is driven electrically by means of the electric machine. During heating operation, combustion processes in the, or all, combustion chambers 14 of the combustion engine cease, and during heating operation the output shaft is stationary. In addition, in heating operation the heating medium is warmed by means of the heating element 18, so that the exhaust gas aftertreatment device 20 is warmed or heated by means of the warmed heating medium in heating operation.

In order to be able to heat the exhaust gas aftertreatment device 20 particularly advantageously and particularly quickly, the combustion engine 10 has at least one conduit element 28 which is fluidically connected to the exhaust gas tract 16 at a first connection point 30 arranged downstream of the exhaust gas aftertreatment device 20 and at a second connection point 32 arranged upstream of the heating element 18, in particular upstream of the turbine wheel 26. By means of the conduit element 28, at least some of the heating medium flowing through the exhaust gas tract 16 can be branched off from the exhaust gas tract 16 at the first connection point 30 and returned from the first connection point 30 to the second connection point 32 and introduced into the exhaust gas tract 16 at the second connection point 32. This allows the heating medium to be returned, since the heating medium is returned by means of the conduit element 28 from the first connection point 30 to the second connection point 32, which is arranged upstream in relation thereto, and is introduced into the exhaust gas tract 16. This return of the heating medium creates a first recirculation circuit in which or via which the heating medium can circulate between the connection points 30, 32. The first recirculation circuit can be operated by means of the electrically driven exhaust gas turbocharger 22, in particular in a state referred to as a stopped engine. As a result, the exhaust gas aftertreatment device 20 can already be heated up when the engine is stopped and thus can be conditioned in a particularly advantageous manner. Therefore, the combustion engine 10 has a particularly low emission of pollutants. A stopped engine means that no combustion processes take place in the combustion engine 10 and the output shaft is stationary.

There is arranged in the conduit element 28 a valve element 34, by means of which a quantity of the heating medium flowing through the conduit element 28 can be adjusted. For this purpose, the valve element 28 can be connected to a control device, which is represented by a control unit, for example.

By means of an exhaust gas valve element 35 which is arranged in the exhaust gas tract 16 downstream of the first connection point 30 and which is configured, for example, as an exhaust gas flap, a mass flow of the exhaust gas and/or heating medium leaving the combustion engine 10 can be reduced or prevented or accumulated. In order to set a defined mass flow, the exhaust gas valve element 35 can be connected to a control device which is, for example, a control unit and can actuate and thereby operate, in particular control in an open-loop or closed-loop manner, the exhaust gas valve element 35. By at least partially closing the exhaust gas tract 16 by means of the exhaust gas valve element 35, it is possible to cause a particularly large quantity of the heating medium to flow through the recirculation circuit, i.e., to circulate via or along the recirculation circuit. In this case, the recirculation circuit comprises the conduit element 28, so that the heating medium flowing through the recirculation circuit flows through the conduit element 28 and thus circulates via the conduit element 28. This circulation or recirculation allows the exhaust gas aftertreatment device 20 to be heated particularly quickly and effectively.

The combustion engine 10 has an exhaust gas return conduit 36. The exhaust gas return conduit 36 is fluidically connected to the exhaust gas tract 16 at a branch point 38 arranged downstream of the exhaust gas aftertreatment device 20. Furthermore, the exhaust gas return conduit 36 is fluidically connected to the intake tract 12 at an inlet point 40. By means of the exhaust gas return conduit 36, in particular during fired operation, at least some of the exhaust gas flowing through the exhaust gas tract 16 can be guided from the branch point 38 to the inlet point 40 and introduced into the intake tract 12 at the inlet point 40. The inlet point is arranged in the intake tract downstream of the first impeller 24, but can alternatively be arranged upstream of the first impeller 24, which is not shown in the FIGURE. In heating operation, at least some of the heating medium can be routed from the branch point 38 to the inlet point 40 and can be introduced into the intake tract 12 at the inlet point 40. In this way, a second recirculation circuit of the heating medium can be provided during heating operation via the exhaust gas return conduit 36. The heating medium is conveyed by the electrically driven first impeller 24 and/or the electrically driven second impeller 26 of the exhaust gas turbocharger 22. The second recirculation circuit can be operated independently of the first recirculation circuit or together with the first recirculation circuit. There is arranged in the exhaust gas return conduit 36 an exhaust gas return valve 42, by means of which a quantity of the exhaust gas and/or of the heating medium that can flow through the exhaust gas return conduit 36 can be adjusted. For this purpose, the exhaust gas return valve 42 can be connected to a control device, which is represented by the control unit, for example.

The combustion engine 10 has a return conduit 44 which is fluidically connected to the exhaust gas tract at a third connection point 46 arranged upstream of the second impeller 26 and is fluidically connected to the intake tract 12 at a fourth connection point 48. The fourth connection point 48 can preferably be arranged downstream of the first impeller 24. By means of the return conduit 44, at least some of the exhaust gas can be guided in a first flow direction from the third connection point 46 to the fourth connection point 48 and can be introduced into the intake tract 12 at the fourth connection point 48. In heating operation, the heating medium can be guided in a second flow direction, opposite to the first flow direction, from the fourth connection point 48 to the third connection point 46 and can be introduced into the exhaust gas tract 16 at the third connection point 46. In this case, the heating medium is conveyed by means of at least the electrically driven first impeller 24 from the intake tract to the heating element 18, bypassing the combustion chamber 14. There is arranged in the return conduit 44 a return valve 50, by means of which a quantity of the exhaust gas or the heating medium that can flow through the return conduit 44 can be adjusted. For this purpose, the return valve 50 can be connected to a control device, which is represented by the control unit, for example.

The heating element 18 can comprise an electric heating element and/or a burner and/or an electrically heatable catalyst.

LIST OF REFERENCE CHARACTERS 10 combustion engine
12 intake tract
14 combustion chamber
16 exhaust gas tract
18 heating element
20 exhaust gas aftertreatment device
22 exhaust gas turbocharger
24 compressor wheel
26 turbine wheel
28 conduit element
30 first connection point
32 second connection point
34 valve element
35 exhaust gas valve element
36 exhaust gas return conduit
38 removal point
40 inlet point
42 exhaust gas return valve
44 return conduit
46 third connection point
48 fourth connection point
50 return valve

The invention claimed is:

1. A combustion engine (10) for a motor vehicle, comprising:
an output shaft via which the motor vehicle is drivable by the combustion engine (10);
an intake tract (12) through which air to be supplied to a combustion chamber (14) of the combustion engine (10) is flowable;
an exhaust gas tract (16) through which an exhaust gas from the combustion chamber (14) is flowable;
an exhaust gas aftertreatment device (20) disposed in the exhaust gas tract (16) for aftertreating the exhaust gas;
a heating element (18) disposed in the exhaust gas tract (16) upstream of the exhaust gas aftertreatment device (20) for heating a gas flowing through the exhaust gas tract (16);
an electrically assisted exhaust gas turbocharger (22) which has a compressor wheel disposed in the intake tract (12) as a first impeller (24) for compressing air flowing through the intake tract (12), a turbine wheel as a second impeller (26) which is disposed in the exhaust gas tract (16) and which is drivable by the exhaust gas, and an electric machine via which at least one of the first and second impellers (24, 26) is drivable in a heating operation for heating the exhaust gas aftertreatment device (20), wherein in the heating operation, during which combustion processes in the combustion chamber (14) do not take place and the output shaft is at a standstill, air is conveyable as a heating medium by the at least one of the first and second impellers (24, 26) into the exhaust gas tract (16) and is warmable by the heating element (18) in the heating operation to heat the exhaust gas aftertreatment device (20); and
a conduit element (28) which is fluidically connected to the exhaust gas tract (16) at a first connection point (30) disposed downstream of the exhaust gas aftertreatment device (20) and which is fluidically connected to the exhaust gas tract (16) at a second connection point (32) disposed upstream of the heating element (18) and downstream of the combustion chamber (14), wherein at least a portion of the heating medium is returnable from the first connection point (30) to the second connection point (32) and is introducible into the exhaust gas tract (16) at the second connection point (32).

2. The combustion engine (10) according to claim 1, further comprising a valve element (34) which is disposed in the conduit element (28) and via which a quantity of the heating medium that is flowable through the conduit element (28) is adjustable.

3. The combustion engine (10) according to claim 1, further comprising an exhaust gas return conduit (36) which is fluidically connected to the exhaust gas tract (16) at a branch point (38) disposed downstream of the exhaust gas aftertreatment device (20) and which is fluidically connected to the intake tract (12) at an inlet point (40), wherein at least a portion of the exhaust gas and/or, in the heating operation, at least a portion of the heating medium is guidable from the branch point (38) to the inlet point (40) and is introducible into the intake tract (12) at the inlet point (40).

4. The combustion engine (10) according to claim 3, wherein the inlet point (40) is disposed upstream or downstream of the first impeller (24).

5. The combustion engine (10) according to claim 3, further comprising an exhaust gas return valve (42) which is disposed in the exhaust gas return conduit (36) and via which a quantity of the exhaust gas and/or the heating medium that is flowable through the exhaust gas return conduit (36) is adjustable.

6. The combustion engine (10) according to claim 1, further comprising a return conduit (44) which is fluidically connected to the exhaust gas tract (16) at a third connection point (46) disposed upstream of the second impeller (26) and is fluidically connected to the intake tract (12) at a fourth connection point (48), wherein at least a portion of the exhaust gas is guidable from the third connection point (46) to the fourth connection point (48) and is introducible into the intake tract (12) at the fourth connection point (48) and/or, wherein in the heating operation, at least a portion of the heating medium is guidable from the fourth connection point (48) to the third connection point (46) and is introducible into the exhaust gas tract (16) at the third connection point (46).

7. The combustion engine (10) according to claim 6, wherein the fourth connection point (48) is disposed downstream of the electrically assisted exhaust gas turbocharger (22).

8. The combustion engine (10) according to claim 6, further comprising a return valve (50) which is disposed in the return conduit (44) and via which a quantity of the exhaust gas and/or of the heating medium that is flowable through the return conduit (44) is adjustable.

9. The combustion engine (10) according to claim 1, wherein the heating element (18) comprises an electric heating element and/or a burner.

10. A motor vehicle, comprising:
the combustion engine (10) according to claim 1.

* * * * *